United States Patent
Snyder

(10) Patent No.: US 7,069,272 B2
(45) Date of Patent: Jun. 27, 2006

(54) SYSTEM AND METHOD FOR IMPLEMENTING DYNAMIC SET OPERATIONS ON DATA STORED IN A SORTED ARRAY

(75) Inventor: Kirk Snyder, Princeton Junction, NJ (US)

(73) Assignee: Blackrock Financial Management, Inc., New York, NY (US)

( * ) Notice: Subject to any disclaimer, the term of this patent is extended or adjusted under 35 U.S.C. 154(b) by 552 days.

(21) Appl. No.: 10/267,211

(22) Filed: Oct. 9, 2002

(65) Prior Publication Data

US 2004/0073579 A1   Apr. 15, 2004

(51) Int. Cl.
*G06F 17/00*   (2006.01)
(52) U.S. Cl. .............................. 707/102; 707/3; 707/7
(58) Field of Classification Search .............. 707/104.1, 707/102, 7, 3
See application file for complete search history.

(56) References Cited

U.S. PATENT DOCUMENTS 6,321,232 B1   11/2001   Syeda-Mahmood ...... 707/104.1

6,735,595 B1 *   5/2004   Gobeille et al. ............ 707/102

OTHER PUBLICATIONS

Schneier B., "Red-Black Trees", Apr. 1992, Dr. Dobb's Journal vol. 17, No. 4, p. 42, 44-46.*
Thomas H. Cormen, et al., Introduction to Algorithms, pp. 273-293 (MIT Press, 2d ed. 2001).

* cited by examiner

*Primary Examiner*—Luke S Wassum
*Assistant Examiner*—Gwen Liang
(74) *Attorney, Agent, or Firm*—Edwards Angell Palmer & Dodge LLP

(57) ABSTRACT

A system and method are disclosed for implementing dynamic set operations on data stored in a sorted array using a hybrid red-black binary search tree as a data structure. More particularly, the subject invention facilitates the implementation of a binary search to access data items stored in a sorted array by position, rather than by key value. This is accomplished by generating a balanced red-black binary search tree for a sorted array of data items wherein the information stored at each node of the tree includes: a key value; a color; a left pointer to indicate the presence of a child to the left of the node; a right pointer to indicate the presence of a child to the right of the node; a count of descendents along a branch to the left of the node; and a count of descendants along a branch to the right of the node.

19 Claims, 8 Drawing Sheets

| Key Value | Node Color | Left Child Pointer | Right Child Pointer | Left Descendent Count | Right Descendent Count |
|---|---|---|---|---|---|
| 414 | Black | Yes | Yes | 5 | 6 |
| 321 | Red | Yes | Yes | 3 | 1 |
| 714 | Red | Yes | Yes | 3 | 2 |
| 207 | Black | Yes | Yes | 1 | 1 |
| 407 | Black | NIL | NIL | 0 | 0 |
| 614 | Black | Yes | Yes | 1 | 1 |
| 807 | Black | NIL | Yes | 0 | 1 |
| 107 | Red | NIL | NIL | 0 | 0 |
| 214 | Red | NIL | NIL | 0 | 0 |
| 528 | Red | NIL | NIL | 0 | 0 |
| 621 | Red | NIL | NIL | 0 | 0 |
| 914 | Red | NIL | NIL | 0 | 0 |

| Trade Date | Dealer | Desk | Transaction | Quantity | Price | Net Money |
|---|---|---|---|---|---|---|
| 01/07/2002 | ML | TSY | BUY | 200,000.00 | 124.50 | 24,900,000.00 |
| 02/07/2002 | ML | TSY | BUY | 100,000.00 | 98.75 | 9,875,000.00 |
| 02/14/2002 | ML | TSY | BUY | 400,000.00 | 115.00 | 46,000,000.00 |
| 03/21/2002 | GS | TSY | SELL | -200,000.00 | 102.50 | -20,500,000.00 |
| 04/07/2002 | SAL | MBS | BUY | 500,000.00 | 100.25 | 50,125,000.00 |
| 04/14/2002 | SAL | MBS | BUY | 800,000.00 | 100.50 | 80,400,000.00 |
| 05/28/2002 | SAL | MBS | SELL | -400,000.00 | 112.75 | -45,100,000.00 |
| 06/14/2002 | GS | TSY | BUY | 400,000.00 | 99.75 | 39,900,000.00 |
| 06/21/2002 | GS | TSY | BUY | 200,000.00 | 114.50 | 22,900,000.00 |
| 07/14/2002 | ML | TSY | SELL | -500,000.00 | 110.25 | -55,125,000.00 |
| 08/07/2002 | ML | TSY | BUY | 100,000.00 | 97.50 | 9,750,000.00 |
| 09/14/2002 | ML | TSY | SELL | -100,000.00 | 100.50 | -10,050,000.00 |

FIG. 2

| Key Value | Node Color | Left Child Pointer | Right Child Pointer | Left Descendent Count | Right Descendent Count |
|---|---|---|---|---|---|
| 414 | Black | Yes | Yes | 5 | 6 |
| 321 | Red | Yes | Yes | 3 | 1 |
| 714 | Red | Yes | Yes | 3 | 2 |
| 207 | Black | Yes | Yes | 1 | 1 |
| 407 | Black | NIL | NIL | 0 | 0 |
| 614 | Black | Yes | Yes | 1 | 1 |
| 807 | Black | NIL | Yes | 0 | 1 |
| 107 | Red | NIL | NIL | 0 | 0 |
| 214 | Red | NIL | NIL | 0 | 0 |
| 528 | Red | NIL | NIL | 0 | 0 |
| 621 | Red | NIL | NIL | 0 | 0 |
| 914 | Red | NIL | NIL | 0 | 0 |

FIG. 4

| Trade Date | Dealer | Desk | Transaction | Quantity | Price | Net Money |
|---|---|---|---|---|---|---|
| 01/07/2002 | ML | TSY | BUY | 200,000.00 | 124.50 | 24,900,000.00 |
| 02/07/2002 | ML | TSY | BUY | 100,000.00 | 98.75 | 9,875,000.00 |
| 02/14/2002 | ML | TSY | BUY | 400,000.00 | 115.00 | 46,000,000.00 |
| 03/21/2002 | GS | TSY | SELL | -200,000.00 | 102.50 | -20,500,000.00 |
| 04/07/2002 | SAL | MBS | BUY | 500,000.00 | 100.25 | 50,125,000.00 |
| 04/14/2002 | SAL | MBS | BUY | 800,000.00 | 100.50 | 80,400,000.00 |
| 05/28/2002 | SAL | MBS | SELL | -400,000.00 | 112.75 | -45,100,000.00 |
| 06/07/2002 | SAL | MBS | SELL | -200,000.00 | 100.00 | -20,000,000.00 |
| 06/14/2002 | GS | TSY | BUY | 400,000.00 | 99.75 | 39,900,000.00 |
| 06/21/2002 | GS | TSY | BUY | 200,000.00 | 114.50 | 22,900,000.00 |
| 07/14/2002 | ML | TSY | SELL | -500,000.00 | 110.25 | -55,125,000.00 |
| 08/07/2002 | ML | TSY | BUY | 100,000.00 | 97.50 | 9,750,000.00 |
| 09/14/2002 | ML | TSY | SELL | -100,000.00 | 100.50 | -10,050,000.00 |

FIG. 5

| Trade Date | Dealer | Desk | Transaction | Quantity | Price | NetMoney |
|---|---|---|---|---|---|---|
| 01/07/2002 | ML | TSY | BUY | 200,000.00 | 124.50 | 24,900,000.00 |
| 02/07/2002 | ML | TSY | BUY | 100,000.00 | 98.75 | 9,875,000.00 |
| 02/14/2002 | ML | TSY | BUY | 400,000.00 | 115.00 | 46,000,000.00 |
| 03/21/2002 | GS | TSY | SELL | -200,000.00 | 102.50 | -20,500,000.00 |
| 04/07/2002 | SAL | MBS | BUY | 500,000.00 | 100.25 | 50,125,000.00 |
| 04/14/2002 | SAL | MBS | BUY | 800,000.00 | 100.50 | 80,400,000.00 |
| 05/28/2002 | SAL | MBS | SELL | -400,000.00 | 112.75 | -45,100,000.00 |
| 06/14/2002 | GS | TSY | BUY | 400,000.00 | 99.75 | 39,900,000.00 |
| 07/14/2002 | ML | TSY | SELL | -500,000.00 | 110.25 | -55,125,000.00 |
| 08/07/2002 | ML | TSY | BUY | 100,000.00 | 97.50 | 9,750,000.00 |
| 09/14/2002 | ML | TSY | SELL | -100,000.00 | 100.50 | -10,050,000.00 |

FIG. 7

SYSTEM AND METHOD FOR IMPLEMENTING DYNAMIC SET OPERATIONS ON DATA STORED IN A SORTED ARRAY

COPYRIGHT NOTICE

A portion of the disclosure of this patent document contains material which is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND OF THE INVENTION

1. Field of the Invention

The subject disclosure relates to data structures, and more particularly, to a system and method for implementing dynamic set operations on data stored in a sorted array using a hybrid red-black binary search tree.

2. Background of the Related Art

Binary search trees are data structures that store collections of items that can be ordered, such as integers. In a binary search tree, a data item is stored at a root. Smaller items are organized recursively in a subtree to the left of the root, while larger items are stored recursively in a subtree to the right of the root, as illustrated for example in FIG. 1. The right and left subtrees contain nodes storing the items in the collection. Those skilled in the art will readily appreciate that there are many possible search trees for a given collection of items.

Binary search trees support standard dynamic set operations such as search, insert and delete. A search is implemented to determine whether an item is contained in a tree, and if so, it returns the item. Insert is implemented to add an item to a collection stored in a tree, if it is not already present, and delete is implemented to remove an item from a collection stored in a tree. A binary search tree of height h can implement any standard dynamic set operation in O(h) time. Thus, set operations are fast if the height of the tree is small, but if the height of the tree is large, their performance may be no better than operations implemented with a linked list of data items.

A red-black tree is a binary search tree with one extra bit of storage per node: its color, which can be either red or black. By constraining the way nodes can be colored on any path from the root to a leaf, red-black trees ensure that no such path is twice as long as any other, so that the tree is approximately balanced. Thus; basic dynamic set operations on a red-black tee with n nodes take O(lg n) time in the worst case.

Each node of a red-black tree contains the fields color, key, left child pointer, right child pointer and parent. If a child or the parent of the node does not exist, the corresponding pointer field of the node contains the NIL value. NIL's are regarded as pointers to external nodes (leaves) of the binary search tree, and the normal, key-bearing nodes are regarded as internal nodes of the tree.

A binary search tree is a red-black tree if it satisfies the following red-black properties:
1) Every node is either red or black.
2) The root is black.
3) Every leaf (NIL) is black.
4) If a node is red, then both its children are black.
5) For each node, all paths from the node to descendant leaves contain the same number of black nodes.

Often, large sets of data items are displayed in tabular form, where the data items are arranged in rows. In many applications, for instance, in investment portfolios containing a multiplicity of financial instruments, the rows of the table are maintained in sorted order, and there are frequent single row insertions and deletions which must be displayed in real-time.

There are various computer applications that are currently available for displaying tabular data. Two used commonly are XRT tables for Motif based applications and JTables for Java based applications. These applications present a "view" into the table consisting of a fixed number of rows and columns which will fit onto a screen. Behind this view, is application code which supplies data to the view. In Java, this code is called a TableModel. The JTable and other similar applications retrieve data by calling the data model and requesting the value at a cell specified by row and column index. As the user scrolls around the table, there are an enormous amount of calls to the data model as different cells move into view.

The clear way for the TableModel to store data is in an array of rows, where each row contains an array of columns. In the majority of table applications, this method is quite appropriate, as it provides fast access to any individual cell by indexing into the row array, then indexing into the column array. In tables where the rows are either unsorted or there are infrequent row changes, this method is ideal. If the array is sorted but unchanging, one can use any fast sorting algorithm to create the sorted array, then access data quickly. If the array changes frequently, but the order is unimportant, new rows can be added at the end of the array very quickly.

A problem arises however, when the rows of the table are maintained in sorted order and there are frequent additions and deletions, as is common with investment portfolios. If an array representation is used, to insert a new row in the table, all of the rows below the new row must be moved down, in sorted order, to make room for the new row. This takes time proportional to the number of rows in the table. If the table is large and insertions are frequent, there will be a performance problem.

This problem can be overcome by storing the data in a binary search tree rather than in an array of rows and columns, since set operations such as insertions and deletions take place in a standard binary search tree in O(h) time, or in an red-black tree in O(lg n) time in the worst case. However, binary search trees, including red-black trees, do not provide access to data items by their position in an array. Rather, they provide access to data items by key value.

For example, if an array of data consists of a set of trades involving fixed income securities which are displayed in entry date order, a binary search tree can be generated which allows a user to perform standard dynamic set operations such as search, delete and insert in O(h) time. But when the TableModel is asked to search for and return a trade at particular position in the table, rather than one with a particular entry data, it is unable to do so. In conventional binary search trees, including red-black trees, there is no direct access to a data item by its position, unlike in an array wherein data may be retrieved by row and column index. Therefore, it would be beneficial to construct a data structure, and preferably a modified red-black tree that can facilitate assess to data items at given positions in a table of sorted rows, as quickly as rows can be found by key value.

SUMMARY OF THE INVENTION

The subject invention is directed to a system and method for implementing dynamic set operations on data stored in a sorted array using a hybrid red-black binary search tree as a data structure. More particularly, the subject invention facilitates the implementation of a binary search to access data items stored in a sorted array by position or index, as well as by key value, as in conventional red-black trees.

This is accomplished by generating a balanced red-black binary search tree for a sorted array of data items wherein the information stored at each node of the search tree includes: a key value corresponding to a data item in the sorted array; a color selected from the group consisting of red and black; a left pointer to indicate the presence of a child to the left of the node; a right pointer to indicate the presence of a child to the right of the node; a count of descendents along a branch to the left of the node; and a count of descendants along a branch to the right of the node.

Using this data structure, a binary search can be conducted to access and retrieve a selected data item at a given position in the sorted array by reference to the right and left descendant counts at each node. With respect to sorted tabular data, the data structure of the subject invention can find rows at a given position in a sorted table as fast as it can with a given key value. As a result, rows can be added, deleted or updated in O(lg n) time.

These and other aspects of the system and method of the subject invention will become more readily apparent to those having ordinary skill in the art from the following detailed description of the invention taken in conjunction with the drawings described herein below.

BRIEF DESCRIPTION OF THE DRAWINGS

So that those having ordinary skill in the art to which the subject invention appertains will more readily understand how to employ the same, reference may be had to the drawings wherein:

FIG. 2 is a data table displaying a set of trades presented in sorted rows ordered by entry date;

FIG. 4 is a table containing the information stored at each node in the red-black binary search tree of FIG. 3;

FIG. 5 shows the data table of FIG. 2, wherein a single row of data has been inserted into the table, and wherein the inserted row is highlighted;

FIG. 7 shows the data table of FIG. 2, wherein a single row of data has been deleted from the table.

DETAILED DESCRIPTION OF THE PREFFERED EMBODIMENTS

Figure 1:
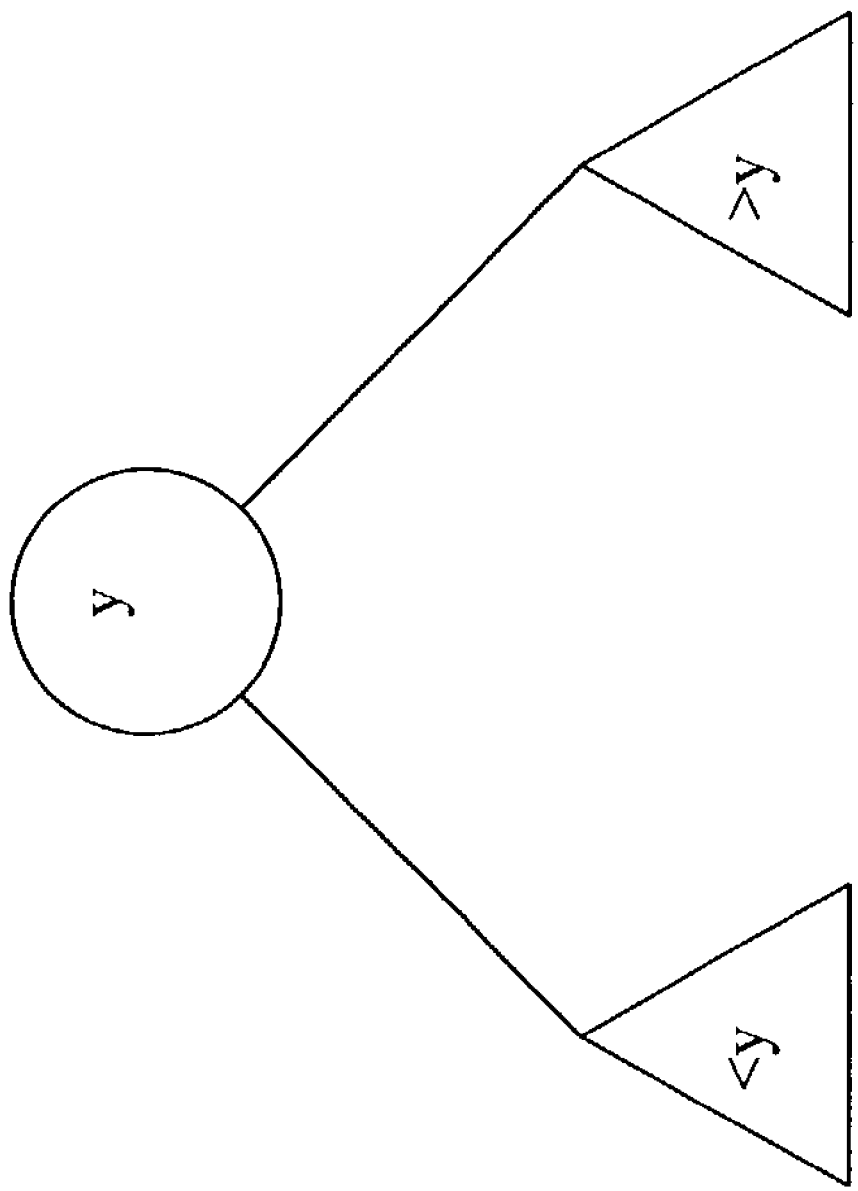
FIG. 1 is an illustration of a conventional binary tree wherein a data item y is stored at the root node, and smaller items are organized recursively in the left subtree, while larger items are organized recursively in the right subtree.

Referring now to the drawings, there is illustrated in FIG. 2 a data table designated generally by reference numeral 10 which contains an array of data or information relating to a set of trades involving fixed income securities. In this example, data table 10 contains information concerning Treasury notes (TSY) and mortgage backed securities (MBS). Data table 10 contains a plurality of rows and columns. The columns of the data table contain information relating to the date of a trade, the name of the dealer involved in the trade, the name of the desk where the trade originated (e.g., TSY or MBS), the type of transaction (i.e., buy or sell) the quantity of securities transacted, the price of the securities transacted, and the net money associated with each trade. Each row of the data table represents a particular trade and they are organized or sorted by the date on which the trade occurred. In this example, the earliest trade in the table occurred on Jan. 1, 2002 and the latest trade occurred on Sep. 14, 2002. Data table 10 is preferably a JTable supported by a Java based TableModel. However, other computer applications may also be employed.

Figure 3:
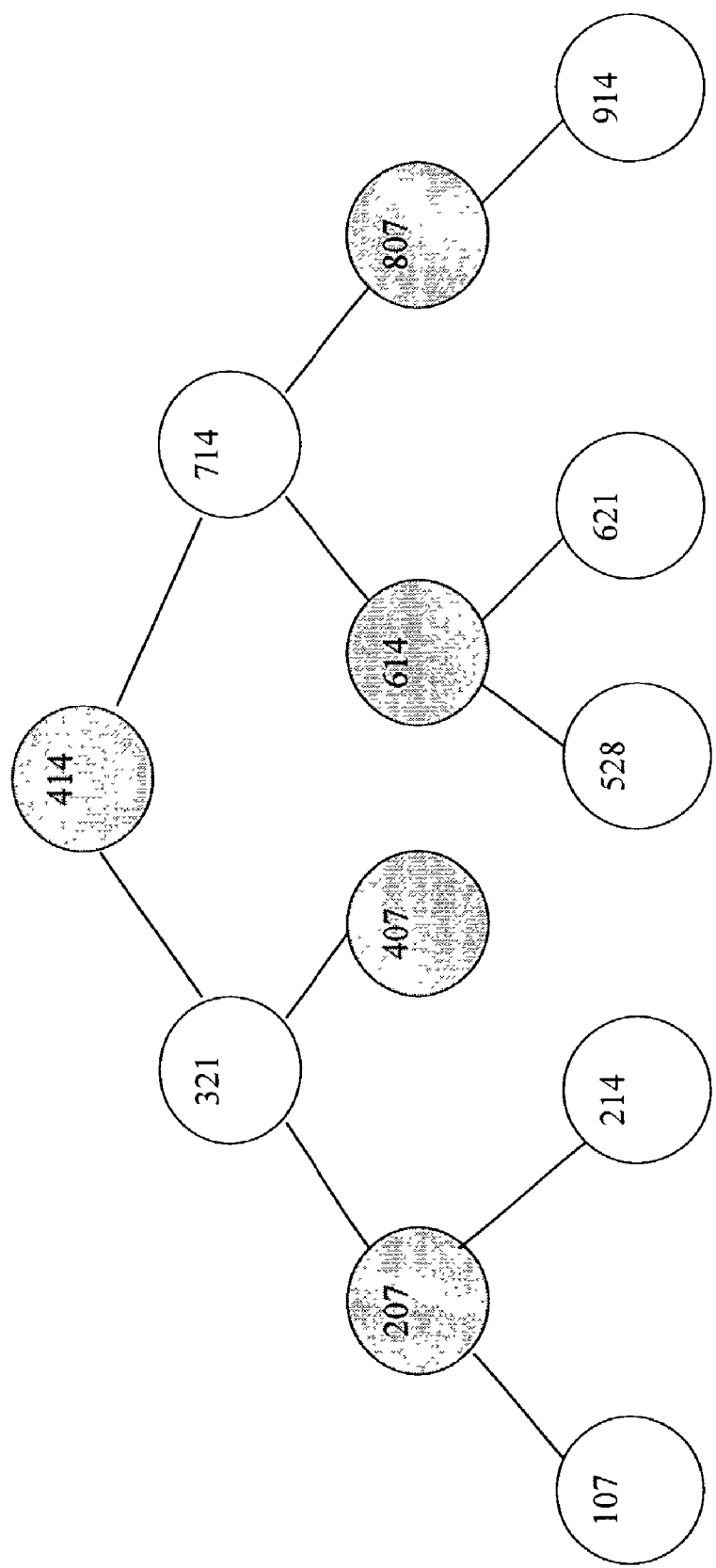
FIG. 3 is an illustration of a red-black binary search tree generated from the data contained in the data table of FIG. 2, with the row of the table corresponding to the root node of the tree highlighted, wherein information is stored at each node which includes, inter alia, the number of descendants along the right and left branches of the node.

Referring to FIG. 3, there is illustrated a red-black binary search tree designated by reference numeral 20 that has been generated from the information set forth in data table 10 of FIG. 2, with the highlighted row containing the trade that occurred on Apr. 14, 2002 serving as the root of the binary tree. The red black binary tree 20 of FIG. 3 is constructed based upon the red-black properties set forth hereinabove, namely, that every node in the tree is either red or black, the root of the tree is black, every leaf (NIL) is black, if a node is red, then both its children are black, and for each node in the tree, all paths from the node to descendant leaves contain the same number of black nodes. These predefined properties of a red-black tree are well known in the art.

The following Java class generates the data structure of the hybrid red-black tree of the subject invention. This class, as well as other routines set forth herein, are based upon pseudocodes presented in Thomas H. Cormen, et al., *Introduction to Algorithms*, pp. 273–293 (MIT Press, 2d ed. 2001), which is incorporated herein by reference. The nodal structure of the hybrid red-black tree of the subject invention is substantially identical to that of a conventional red-black tree, except that the following code is designed to store the number of descendants down each branch of a node.

```
class AMTRowSet {
    private final int black = 1;
    private final int red = 0;
    private int treeSize;
    private class Node {
        Node(Comparable key) {
            this.key = key;
            color = black;
            left = sentinel;
            right = sentinel;
            parent = sentinel;
            leftCount = 0;
            rightCount = 0;
        }
        Node( ) {
            key = null;
            color = black;
            left = null;
            right = null;
            parent = null;
```

-continued

```
            leftCount = 0;
            rightCount = 0;
        }
        Comparable key;
        int color;
        Node left;
        Node right;
        int leftCount;
        int rightCount;
        Node parent;
    }
    private Node root;
    private final Node sentinel = new Node( );
    private int lastIndex = −1;
    private Node lastNode = null;
    AMTRowSet( ) {
        root = sentinel;
        treeSize = 0;
    }
```

Continuing on with the example of FIGS. 2 and 3, the key values stored at the root and each internal node of the tree represent the trade date set forth in table 10. For instance, the key value of the root is 414 which corresponds to the trade date of Apr. 14, 2002, located at row six of data table 10. Similarly the red node to the left of the root contains the key value 321 representing the trade date of Mar. 21, 2002 located at row 4 of data table 10, while the red node to the right of the root node contains the key value 714 corresponding to the trade date of Jul. 14, 2002, which is located at the tenth row of data table 10.

In addition to the key value, additional information relating to the structure of the tree is stored at each node of red-black binary tree 20. This information, which is tabulated in FIG. 4 for illustrative purposes, includes traditional red-black tree information, namely, the node color (e.g., red or black), a left child pointer indicating the existence of a descendant to the left of the node and a right child pointer indicting the existence of a descendant to the right of the node. In accordance with the subject invention, additional information is stored at each node of the search tree, namely, the number of descendents contained in a branch to the left of each node and the number of descendants contained in a branch to the right of each node. This additional information facilitates a binary search of the red-black tree to access and retrieve data by position or index, as well as by key value.

In accordance with the subject invention, all binary searches using the hybrid red-black tree disclosed herein begin at the last row located in the data table. Therefore, it is necessary to keep track of this row as it serves as a reference point for the operation.

The following is a Java class that locates an element or item in a TableModel of a JTable by index or position.

```
Object get(int index) {
    if (lastIndex < 0) {
        lastNode = root;
        lastIndex = root.leftCount;
    }
    while (lastNode != sentinel) {
        if (index == lastIndex) {
            return lastNode.key;
        } else if (index < lastIndex − lastNode.leftCount ||
                       index > lastIndex + lastNode.rightCount) {
            if (lastNode.parent == sentinel) {
                break;
```

```
        } else if (lastNode == lastNode.parent.left) {
            lastIndex = lastIndex + lastNode.rightCount + 1;
        } else {
            lastIndex = lastIndex − lastNode.leftCount − 1;
        }
        lastNode = lastNode.parent;
    } else if (index < lastIndex) {
        lastNode = lastNode.left;
        lastIndex = lastIndex − lastNode.rightCount − 1;
    } else {
        lastNode = lastNode.right;
        lastIndex = lastIndex + lastNode.leftCount + 1;
    }
}
lastIndex = −1;
return null;
}
```

By way of example, referring to the data table of FIG. 2 in conjunction with the corresponding red-black binary search tree of FIG. 3, suppose that a request is made to retrieve the data in the ninth row of the table, as opposed to the trade that occurred on Jun. 21, 2002. Those skilled in the art and familiar with Java based applications will readily appreciate that in JTables, such requests are commonly made using the command getCellValue. Beginning at the root node of binary tree 20, which in this example is row six, it is known that the first five rows are ordered recursively to the left of the root node (these rows are represented by nodes containing key values (i.e., trade dates) that are less than the key value of the root), while the last six rows are ordered recursively to the right of the root node (these rows are represented by nodes containing key values (i.e., trade dates) that are greater than the key value of the root). Since the request is for the ninth row of the table, the left branch of the tree is not searched. Instead, the right branch is searched.

Looking to the first node of six in the right branch of the root, the left descendent count is equal to 3, and the right descendent count is equal to 2. Therefore, the ninth row must be down the left sub-branch, rather than the right sub-branch, because the eleventh and twelfth rows are obviously down the right sub-branch, based upon the right descendant count. So the search proceeds down the left sub-branch. At the parent node of the left sub-branch, it is determined that there is one descendant to the left of the node and one descendant to the right. Therefore, the ninth row in data table 10 must be the right child node, and indeed it is.

In addition to supporting indexed access through binary searching based on descendant counts, the data structure disclosed herein supports standard dynamic set operations of insert, delete and retrieve by key value. These operations all work normally in O(lg n) time. Insertions and deletions are accomplished as in an ordinary binary search trees. However, because such operations result in modifications to the tree, the resulting structure may violate the red-black properties set forth hereinabove.

To restore the red-black properties, the colors and pointer structures of some nodes in the tree must be changed. Changes to the pointer structure of a node are accomplished through rotations which are local operations that preserve the binary-search-tree property. There are two types of rotations: left rotations and right rotations.

The following routine performs a left rotation and is designed to keep track of the number of descendants on each side of the node being operated upon.

```
private void leftRotate(Node x) {
    Node y = x.right;
    x.right = y.left;
    x.rightCount = y.leftCount;
    if (y.left != sentinel) {
        y.left.parent = x;
    }
    y.parent = x.parent;
    if (x.parent == sentinel) {
        root = y;
    } else if (x == x.parent.left) {
        x.parent.left = y;
    } else {
        x.parent.right = y;
    }
    y.left = x;
    y.leftCount = x.leftCount + x.rightCount + 1;
    x.parent = y;
}
```

This routine performs a right rotation and is designed to keep track of the number of descendants on each side of the node being operated upon.

```
private void rightRotate(Node x) {
    Node y = x.left;
    x.left = y.right;
    x.leftCount = y.rightCount;
    if (y.right != sentinel) {
        y.right.parent = x;
    }
    y.parent = x.parent;
    if (x.parent == sentinel) {
        root = y;
    } else if (x == x.parent.left) {
        x.parent.left = y;
    } else {
        x.parent.right = y;
    }
    y.right = x;
    y.rightCount = x.leftCount + x.rightCount + 1;
    x.parent = y;
}
```

Figure 6:
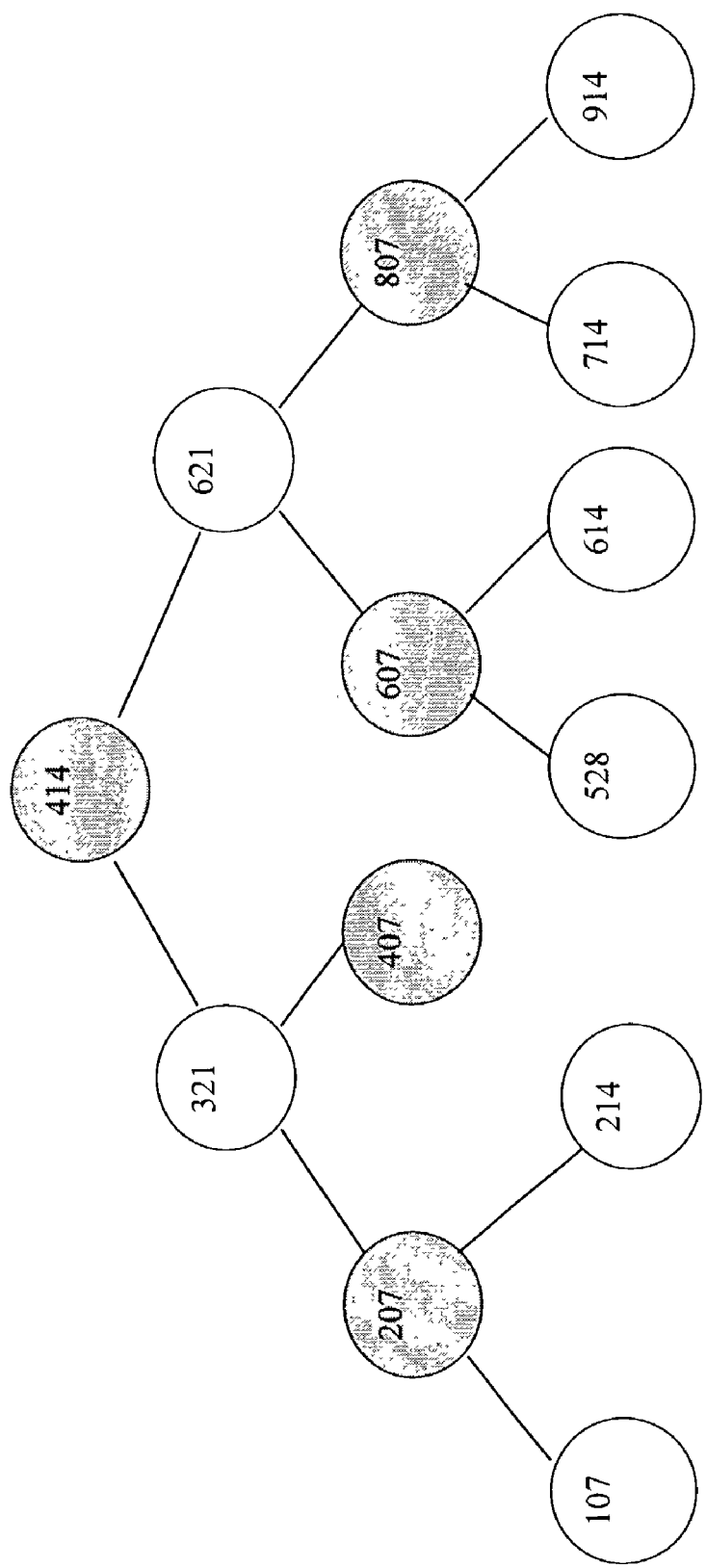
FIG. 6 is an illustration of the red-black binary search tree of FIG. 3, after the structure of the tree has been adjusted to accommodate for the insertion of the new row of data as shown in the table of FIG. 5.

When a node is inserted into a red-black tree, it is colored red. If the node has a red parent, then there is a violation of the red-black properties. If the uncle is also red, the parent and uncle are colored black, and the grandparent is colored red. Then a check is made to determine if a violation of the red-black properties remains. Otherwise, one or two rotations may be needed to satisfy the red-black properties, but no more than two rotations will be required in any case. By way of example, FIG. 6 illustrates the red-black tree of FIG. 3 after it has been modified following the insertion of a node as represented by the modified data table of FIG. 5.

The following routine performs an insertion procedure in a red-black tree. This Java class includes code for tracking descendant counts. Initially, the item is inserted into the tree without concern for preserving the red-black properties.

```
int index = 0;
Node y = sentinel;
Node x = root;
boolean wentLeft = false;
while (x != sentinel) {
    y = x;
    int comp = key.compareTo(x.key);
```

-continued

```
    if (comp == 0) {
        index += x.leftCount;
        while (x.parent != sentinel) {
            if (x == x.parent.left) {
                x.parent.leftCount--;
            } else {
                x.parent.rightCount--;
            }
            x = x.parent;
        }
        return index;
    } else if (comp < 0) {
        x.leftCount++;
        x = x.left;
        wentLeft = true;
    } else {
        index = index + x.leftCount + 1;
        x.rightCount++;
        x = x.right;
        wentLeft = false;
    }
}
++treeSize;
lastIndex = -1;
Node z = new Node(key);
z.parent = y;
if (y == sentinel) {
    root = z;
} else if (wentLeft) {
    y.left = z;
} else {
    y.right = z;
}
```

After an item has been inserted into the binary tree, the following routine is employed to re-establish the red-black properties of the tree, if necessary.

```
z.color = red;
resetSentinel( );
while (z.parent.color == red) {
    if (z.parent == z.parent.parent.left) {
        y = z.parent.parent.right;
        if (y.color == red) {
            z.parent.color = black;
            y.color = black;
            z.parent.parent.color = red;
            z = z.parent.parent;
        } else {
            if (z == z.parent.right) {
                z = z.parent;
                leftRotate(z);
            }
            z.parent.color = black;
            z.parent.parent.color = red;
            rightRotate(z.parent.parent);
        }
    } else {
        y = z.parent.parent.left;
        if (y.color == red) {
            z.parent.color = black;
            y.color = black;
            z.parent.parent.color = red;
            z = z.parent.parent;
        } else {
            if (z == z.parent.left) {
                z = z.parent;
                rightRotate(z);
            }
            z.parent.color = black;
            z.parent.parent.color = red;
            leftRotate(z.parent.parent);
        }
    }
}
```

```
        root.color = black;
        return index;
}
```

Figure 8:
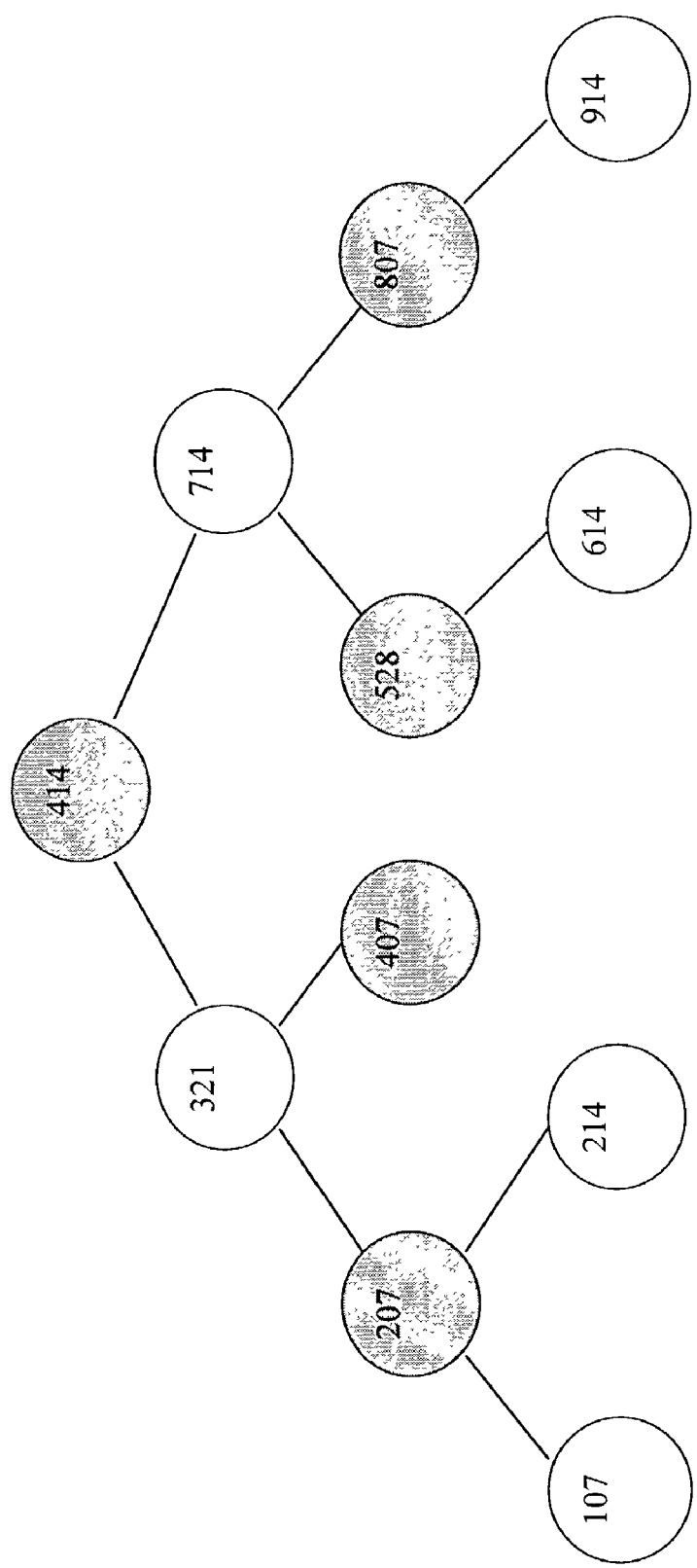
FIG. 8 is an illustration of the red-black binary search tree of FIG. 3, after the structure of the tree has been adjusted to accommodate for the deletion of an existing row of data as shown in the table of FIG. 7.

When deleting a node from a tree, if the node that was excised was red, no additional steps are needed since the red-black tree properties remain intact. Otherwise, if the excised node was black, operations proceed as if there is an extra black node in the tree, and the extra black node is moved up the branches of the tree until the red-black properties are satisfied. At most, three rotations will be required to satisfy all of the properties. By way of example, FIG. 7 illustrates the red-black tree of FIG. 3 after it has been modified following the deletion of a node as represented by the modified data table of FIG. 8.

Initially, before a deletion procedure can begin, the item to be deleted must be located or looked up. The following code is used to perform the initial search for the item to be deleted.

```
        int index = 0;
        Node z = root;
        while (z != sentinel) {
            int comp = key.compareTo(z.key);
            if (comp == 0) {
                break;
            } else if (comp < 0) {
                z = z.left;
            } else {
                index = index + z.leftCount + 1;
                z = z.right;
            }
        }
        if (z == sentinel) {
            return -1;
        }
        index = index + z.leftCount;
        --treeSize;
        lastIndex = -1;
```

After the item to be deleted has been located, the following code performs the deletion of the node. This routine includes code for tracking descendant counts.

```
        Node x = sentinel;
        Node y = sentinel;
        resetSentinel( );
        if (z.left == sentinel || z.right == sentinel) {
            y = z;
        } else {
            y = treeSuccessor(z);
        }
        if (y.left != sentinel) {
            x = y.left;
        } else {
            x = y.right;
        }
        x.parent = y.parent;
        if (y.parent == sentinel) {
            root = x;
        } else if (y == y.parent.left) {
            y.parent.left = x;
        } else {
            y.parent.right = x;
        }
        if (y != z) {
            z.key = y.key;
        }
        fixupCounts(x);
        fixupCounts(y);
        if (y.color == black) {
            rbDeleteFixup(x);
        }
        return index;
}
```

This routine rebuilds the descendant counts from the given node to the root after the node has been spliced from the tree.

```
private void fixupCounts(Node x) {
    while (x != sentinel) {
        if (x.left != sentinel) {
            x.leftCount = x.left.leftCount + x.left.rightCount + 1;
        } else {
            x.leftCount = 0;
        }
        if (x.right != sentinel) {
            x.rightCount = x.right.leftCount + x.right.rightCount + 1;
        } else {
            x.rightCount = 0;
        }
        x = x.parent;
    }
}
```

This routine re-establishes the red-black properties of the tree after the deletion procedure, if necessary. That is, if the deleted node was red, this routine is not performed.

```
private void rbDeleteFixup(Node x) {
    Node w;
    while (x != root && x.color == black) {
        if (x == x.parent.left) {
            w = x.parent.right;
            if (w.color == red) {
                w.color = black;
                x.parent.color = red;
                leftRotate(x.parent);
                w = x.parent.right;
            }
            if (w.left.color == black && w.right.color == black) {
                w.color = red;
                x = x.parent;
            } else {
                if (w.right.color == black) {
                    w.left.color = black;
                    w.color = red;
                    rightRotate(w);
                    w = x.parent.right;
                }
                w.color = x.parent.color;
                x.parent.color = black;
                w.right.color = black;
                leftRotate(x.parent);
                x = root;
            }
        } else {
            w = x.parent.left;
            if (w.color == red) {
                w.color = black;
                x.parent.color = red;
                rightRotate(x.parent);
                w = x.parent.left;
            }
            if (w.left.color == black && w.right.color == black) {
                w.color = red;
                x = x.parent;
```

-continued

```
        } else {
            if (w.left.color == black) {
                w.right.color = black;
                w.color = red;
                leftRotate(w);
                w = x.parent.left;
            }
            w.color = x.parent.color;
            x.parent.color = black;
            w.left.color = black;
            rightRotate(x.parent);
            x = root;
        }
    }
}
x.color = black;
}
```

Although the system and method of the subject invention has been described with respect to preferred embodiments, those skilled in the art will readily appreciate that changes and modifications may be made thereto without departing from the spirit and scope of the present invention as defined by the appended claims.

What is claimed is:

1. A method of accessing data items stored in a sorted array by position comprising the steps of:
   a) providing a sorted array of data items;
   b) generating a balanced binary search tree for the sorted array of data items using a first computer code segment based upon a set of properties that control a structure of the tree, wherein each data item in the sorted array defines a node in the tree, and information is stored at each node including:
      i) a key value corresponding to a data item in the sorted array;
      ii) a color selected from a group consisting of red and black;
      iii) a left pointer to indicate a child to the left of the node;
      iv) a right pointer to indicate a child to the right of the node;
      v) a count of descendents in all sub-trees in a branch to the left of the node; and
      vi) a count of descendants in all sub-trees in a branch to the right of the node; and
   c) conducting a binary search of the tree using a second computer code segment to access a requested data item at a given position in the sorted array by referring to the right and left descendant counts at each node on a path from a root node of the tree to the node of the requested data item, wherein the following steps are executed recursively starting from the root node until the requested data item is found:
      i) deciding a position of a current node by referring to the left and right descendant counts in the left and right branches;
      ii) determining which branch of the tree to search by comparing the given position of the requested data item and the position of the current node;
      iii) designating a top node in the determined branch as the current node and repeating steps from the deciding step if the requested data item is not found at the top node in the determined branch.

2. A method according to claim 1, further comprising the step of adding a data item to the sorted array by inserting a node in the tree.

3. A method according to claim 2, further comprising the step of adjusting the structure of the tree following the insertion of a node such that the tree complies with the set of properties that control the structure thereof.

4. A method according to claim 3, wherein the step of adjusting the structure of the tree following the insertion of a node includes the step of performing at least one local rotation.

5. A method according to claim 3, wherein the step of adjusting the structure of the tree following the insertion of a node includes the step of rebuilding right and left descendant counts for all nodes effected by the adjustment.

6. A method according to claim 1, further comprising the step of removing a data item from the sorted array by deleting a node from the tree.

7. A method according to claim 6, further comprising the step of adjusting the structure of the tree following the deletion of a node such that the tree complies with the set of properties that control the structure thereof.

8. A method according to claim 7, wherein the step of adjusting the structure of the tree following the deletion of a node includes the step of performing at least one local rotation.

9. A method according to claim 7, wherein the step of adjusting the structure of the tree following the deletion of a node includes the step of rebuilding right and left descendant counts for all nodes effected by the adjustment.

10. A machine readable program, tangibly embodied on a computer readable medium, containing instructions for controlling a system for accessing data items stored in a sorted array by position comprising:
    a) means for generating a balanced binary search tree for a sorted array of data items based upon a set of properties controlling a structure of the tree, wherein each data item in the sorted array defines a node in the tree, and each node contains a plurality of data fields for storing information including:
       i) a key value field for storing a key value corresponding to a data item in the sorted array;
       ii) a color field for storing a color selected from a group consisting of red and black;
       iii) a left pointer field for storing a value indicating existence of a child to the left of the node;
       iv) a right pointer field for storing a value indicating existence of a child to the right of the node;
       v) a left count field for storing a value equal to a total number of descendents in all sub-trees in a left branch of the node; and
       vi) a right count field for storing a value equal to a total number of descendants in all sub-trees in a right branch of the node; and
    b) means for conducting a binary search of the tree to access a requested data item at a given position in the sorted array by referring to the values stored in the right and left count fields at each node on a path from a root node of the tree to the node of the requested data item, wherein the following steps are executed recursively starting from the root node until the requested data item is found:
       i) deciding a position of a current node by referring to the left and right descendant counts in the left and right branches;
       ii) determining which branch of the tree to search by comparing the given position of the requested data item and the position of the current node;
       iii) designating a top node in the determined branch as the current node and repeating steps from the deciding step if the requested data item is not found at the top node in the determined branch.

11. The machine readable program of claim 10, further comprising means for adding a data item to the sorted array by inserting a node in the tree.

12. The machine readable program of claim 11, further comprising means for adjusting the structure of the tree following the insertion of a node such that the tree complies with the set of properties that control the structure thereof.

13. The machine readable program of claim 12, wherein the means for adjusting the structure of the tree following the insertion of a node includes means for performing at least one local rotation.

14. The machine readable program of claim 12, wherein the means for adjusting the structure of the tree following the insertion of a node includes means for rebuilding right and left descendant counts for all nodes effected by the adjustment.

15. The machine readable program of claim 10, further comprising means for removing a data item from the sorted array by deleting a node from the tree.

16. The machine readable program of claim 15, further comprising means for adjusting the structure of the tree following the deletion of a node such that the tree complies with the set of properties that control the structure thereof.

17. The machine readable program of claim 16, wherein the means for adjusting the structure of the tree following the deletion of a node includes means for performing at least one local rotation.

18. The machine readable program of claim 16, wherein the means for adjusting the structure of the tree following the deletion of a node includes means for rebuilding right and left descendant counts for all nodes effected by the adjustment.

19. A method of generating a balanced binary search tree for a sorted array of data items using a computer code segment, comprising the steps of:
   a) providing a plurality of nodes each having a key value corresponding to a data item in the sorted array;
   b) assigning a color to each node using the computer code segment based upon a set of properties that control a structure of the tree, wherein the color of a node is selected from the group consisting of red and black;
   c) assigning a role to each node in the tree using the computer code segment, wherein the role of each node is selected from the group consisting of child, parent, uncle and grandparent, depending upon the relationship of each node to a reference node; and
   d) tracking a total number of descendants in a branch to the left of each node and a total number of descendants in a branch to the right of each node to facilitate a binary search of the tree by position as well as by key value using the computer code segment to execute the following steps recursively starting from a root node until a requested data item at a given position is found:
      i) deciding a position of a current node by referring to the left and right descendent numbers in the left and right branches;
      ii) determining which branch of the tree to search by comparing the given position of the requested data item and the position of the current node;
      iii) designating a top node in the determined branch as the current node and repeating steps from the deciding step if the requested data item is not found at the top node in the determined branch.

\* \* \* \* \*